(12) United States Patent
Winters et al.

(10) Patent No.: US 10,369,744 B2
(45) Date of Patent: Aug. 6, 2019

(54) ELECTROSTATIC 3-D DEVELOPMENT APPARATUS USING COLD FUSING

(71) Applicant: Xerox Corporation, Norwalk, CT (US)

(72) Inventors: James A. Winters, Alfred Station, NY (US); Erwin Ruiz, Rochester, NY (US); Paul J. McConville, Webster, NY (US); Jason M. LeFevre, Penfield, NY (US); Chu-heng Liu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 526 days.

(21) Appl. No.: 15/098,825

(22) Filed: Apr. 14, 2016

(65) Prior Publication Data

US 2017/0297288 A1    Oct. 19, 2017

(51) Int. Cl.

| | |
|---|---|
| *B29C 64/165* | (2017.01) |
| *G03G 15/16* | (2006.01) |
| *G03G 15/22* | (2006.01) |
| *B33Y 10/00* | (2015.01) |
| *B33Y 30/00* | (2015.01) |
| *B29K 105/00* | (2006.01) |
| *B29C 64/223* | (2017.01) |

(52) U.S. Cl.
CPC ....... *B29C 64/165* (2017.08); *G03G 15/1625* (2013.01); *G03G 15/224* (2013.01); *B29C 64/223* (2017.08); *B29K 2105/251* (2013.01); *B33Y 10/00* (2014.12); *B33Y 30/00* (2014.12)

(58) Field of Classification Search
CPC ............................. B29C 64/165; B33Y 10/00
See application file for complete search history.

(56) References Cited

U.S. PATENT DOCUMENTS

| | | | | |
|---|---|---|---|---|
| 4,752,352 A | * | 6/1988 | Feygin | B23K 26/083 156/154 |
| 5,127,037 A | | 6/1992 | Bynum | |
| 5,876,550 A | * | 3/1999 | Feygin | B22C 9/00 156/256 |
| 6,066,285 A | * | 5/2000 | Kumar | G03G 15/224 264/317 |
| 6,157,789 A | * | 12/2000 | Kamada | H05K 3/102 399/1 |

(Continued)

FOREIGN PATENT DOCUMENTS

WO    2016030763    3/2016

*Primary Examiner* — Robert C Dye
*Assistant Examiner* — Nicholas R Krasnow
(74) *Attorney, Agent, or Firm* — Gibb & Riley, LLC

(57) ABSTRACT

Layers of build and support material on an intermediate transfer surface are exposed to a solvent using a solvent application station to make the build material tacky, without affecting the support material. Then, the intermediate transfer surface moves past a transfuse station (the transfuse station is positioned to receive the layers after exposure to the solvent) and a platen moves relative to the intermediate transfer surface to contact the platen to one of the layers on the intermediate transfer surface. The intermediate transfer surface transfers a layer of the build material and the support material to the platen each time the platen contacts the layers on the intermediate transfer surface at the transfuse station to successively form a freestanding stack of the layers of build and support material on the platen.

20 Claims, 22 Drawing Sheets

(56) References Cited

U.S. PATENT DOCUMENTS

| | | | |
|---|---|---|---|
| 6,206,672 B1* | 3/2001 | Grenda | G03G 15/1605 |
| | | | 264/484 |
| 6,376,148 B1* | 4/2002 | Liu | B22F 3/008 |
| | | | 156/273.1 |
| 7,250,238 B2 | 7/2007 | Fromm et al. | |
| 7,261,542 B2 | 8/2007 | Hickerson et al. | |
| 7,270,408 B2 | 9/2007 | Odell et al. | |
| 7,851,549 B2 | 12/2010 | Sacripante et al. | |
| 8,470,231 B1 | 6/2013 | Dikovsky et al. | |
| 8,488,994 B2 | 7/2013 | Hanson et al. | |
| 9,193,110 B2 | 11/2015 | Pridoehl et al. | |
| 2006/0249884 A1* | 11/2006 | Partanen | B33Y 10/00 |
| | | | 264/401 |
| 2012/0276233 A1 | 11/2012 | Napadensky | |
| 2013/0186558 A1 | 7/2013 | Comb et al. | |
| 2014/0134334 A1 | 5/2014 | Pridoehl et al. | |
| 2015/0142159 A1 | 5/2015 | Chang | |
| 2015/0145174 A1 | 5/2015 | Comb | |
| 2015/0165675 A1 | 6/2015 | Dawson et al. | |
| 2015/0328835 A1 | 11/2015 | Wu et al. | |
| 2016/0200084 A1* | 7/2016 | Hays | B33Y 10/00 |
| | | | 156/62.2 |
| 2016/0243764 A1* | 8/2016 | Hays | B29C 67/0074 |
| 2019/0077141 A1* | 3/2019 | Hays | B33Y 10/00 |

* cited by examiner

FIG. 22

| ALPHABETICAL LISTING OF MATERIALS | CONCENTRATION + WEIGHT % | ABS | ACETAL | ACRYLIC | CAB | CPVC | ECTFE (HALAR®) | FLUOROSINT® | HDPE | NYLON® TYPE 6/6 | PEEK | PET | POLYCARBONATE | POLYPROPYLENE | POLYSULFONE | PPS | PVC, TYPE I | PVC, TYPE II | PVDF | PTFE | TECATOR™/TORLON® | UHMW |
|---|---|---|---|---|---|---|---|---|---|---|---|---|---|---|---|---|---|---|---|---|---|---|
| ☐ ACETONE | | D | B | D | * | D | A | A | A | A | B | B | C | A | B | A | D | D | D | A | * | * |
| ☐ ALCOHOLS, ALIPHATIC | | * | A | D | * | D | A | A | A | B | A | B | * | * | B | A | * | * | A | A | A | A |
| ☐ BENZENE | | D | A | D | D | * | A | A | D | A | A | A | D | D | D | A | D | D | D | A | A | A |
| ☐ BUTANOL | | * | A | * | * | A | * | A | A | B | A | A | * | * | C | A | A | A | C | A | A | * |
| ☐ CARBON TETRACHLORIDE | | D | * | D | C | C | * | A | D | A | A | B | * | D | A | A | D | D | * | A | A | A |
| ☐ CHLORINE AQ. | 10 | * | A | * | * | C | A | A | C | D | A | A | * | B | D | A | A | A | A | A | * | A |
| ☐ CYCLOHEXANOL | | D | * | D | * | A | A | A | D | B | A | A | * | D | * | * | D | D | B | A | * | A |
| ☐ CYCLOHEXANONE | | * | * | * | D | D | A | A | D | A | A | A | * | D | D | A | D | D | A | A | A | A |
| ☐ ETHYL ACETATE | | D | * | * | D | D | A | A | D | A | A | * | D | D | D | * | D | D | D | A | A | A |
| ☐ ETHYLENE DICHLORIDE | | D | * | D | * | * | A | A | C | B | A | A | D | A | * | A | D | D | D | A | A | * |
| ☐ ETHYLENE GLYCOL AQ. | 96 | * | A | * | * | A | A | A | A | B | A | * | * | C | * | A | A | A | A | A | A | A |
| ☐ HEPTANE | | D | * | * | D | * | A | A | A | A | A | A | C | D | A | A | D | D | A | A | * | A |
| ☐ METHYL CHLORIDE | | * | A | * | * | A | A | A | * | * | A | A | D | * | D | A | D | D | C | A | * | A |
| ☐ NAPHTHALENE | | D | A | * | D | D | A | A | B | B | A | A | * | B | D | A | D | D | B | A | * | B |
| ☐ TOLUENE | | D | B | * | D | D | A | A | D | B | A | B | * | D | D | A | D | D | A | A | A | B |
| ☐ TRICHLORETHYLENE | | * | * | * | * | * | A | A | A | A | A | B | * | A | * | A | D | D | A | A | D | A |
| ☐ TRIETHANOLAMINE | | D | A | * | * | A | A | A | D | A | A | * | D | A | B | A | A | A | A | A | A | A |
| ☐ TURPENTINE | | * | A | * | * | D | A | A | D | A | A | * | D | D | B | A | C | C | A | A | A | A |

ELECTROSTATIC 3-D DEVELOPMENT APPARATUS USING COLD FUSING

BACKGROUND

Systems and methods herein generally relate to three-dimensional (3-D) printing processes that use electrostatic printing processes.

Three-dimensional printing can produce objects using, for example, ink-jet or electrostatic printers. In one exemplary three-stage process, a pulverulent material is printed in thin layers, a UV-curable liquid is printed on the pulverulent material, and finally each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface, such as an intermediate transfer belt (ITB) or drum, a build material development station positioned to electrostatically transfer build material (e.g., ultraviolet (UV) curable build material) to the ITB, and a support material development station positioned to electrostatically transfer support material to a location of the ITB where the UV curable build material is located on the ITB. The support material dissolves in different solvents relative to solvents that dissolve the UV curable build material. The build material development station and the support material development station transfer layers of the UV curable build material and the support material to the platen, each of the layers is on a discrete area of the ITB and is in a pattern.

Also, such structures include a solvent application station that is positioned adjacent the ITB so as to expose the layers on the ITB to a solvent. The solvent is selected to make the build material tacky, without affecting the support material. The solvent forms bonds between polymers of the build material, without affecting the support material, and this makes the layers tacky after exposure to the solvent and promotes transfer of the layers from the ITB to the layers on the platen.

Also, a transfuse station is adjacent the ITB. The transfuse station includes a roller on a first side of the ITB supporting the ITB. The transfuse station is positioned to receive the layers after exposure to the solvent as the ITB moves from the solvent application station past the transfuse station. More specifically, the build material development station the support material development station, the solvent application station, and the transfuse station are positioned relative to the ITB such that a point on the ITB, when the ITB is moving in a process direction, first passes the build material and support material development stations, then passes the solvent application station, and then passes the transfuse station.

In addition, a platen moves relative to the ITB. The ITB transfers a layer of the UV curable build material and the support material to the platen each time the platen contacts one of the layers on the second side (the side opposite the first side) of the ITB at the transfuse station to successively form a freestanding stack of the layers on the platen. Also, such structures can include a second solvent station that is positioned to apply the solvent to the layers that are on the platen, and this makes the top layer on the platen tacky prior to the platen moving back to the transfer station to receive the next layer.

Such structures can also include a heater adjacent the platen. The platen can optionally move from the transfuse station to the heater to heat the layers and join each of the layers together. A pressure roller can also be positioned adjacent the heater. The platen can thus move to the pressure roller to press each of the layers together. Further, a curing station can be positioned to apply UV light to the 3-D structure to cure the layers to one another. Further, in different configurations, the platen can move from the transfuse nip to the heater, the pressure roller, and the curing station after each one of the layers is transferred to the platen at the transfuse nip, or after a previously established number of the layers are transferred to the platen at the transfuse nip.

Such structures can also include a support material removal station positioned to receive the 3-D structure on the platen. The support material removal station applies a solvent that dissolves the support material without affecting the UV curable build material to leave the 3-D structure made of only the UV curable build material.

Various methods herein operate with the above-described structure and electrostatically transfer build material to the intermediate transfer surface using the build material development station, and electrostatically transfer support material to the intermediate transfer surface using the support material development station. The processes of electrostatically transferring build and support material transfers layers of build material and support material to the intermediate transfer surface, where each of the layers is on a discrete area of the ITB and is in a pattern.

Such methods also expose the layers of build and support material on the intermediate transfer surface to a solvent using a solvent application station to make the build material tacky, without affecting the support material. Then, such methods move the intermediate transfer surface to the transfuse station (again, the transfuse station is positioned to receive the layers after exposure to the solvent) and move the platen relative to the intermediate transfer surface to contact the platen to one of the layers on the intermediate transfer surface. The intermediate transfer surface transfers a layer of the build material and the support material to the platen each time the platen contacts the layers on the intermediate transfer surface at the transfuse station to successively form a freestanding stack of the layers of build and support material on the platen.

The solvent forms bonds between polymers of the build material, without affecting the support material, and the layers being tacky after exposure to the solvent promotes transfer of the layers from the intermediate transfer surface to the layers on the platen.

Such methods can optionally move the platen from the transfuse station to the heater to heat the layers and join each of the layers together, and can move the platen to the pressure roller to press each of the layers together. Additionally, these methods can apply the solvent to the layers on the platen using a second solvent station to make the top layer on the platen tacky prior to the platen moving to the transfer station. In different configurations, these methods can move the platen from the transfuse nip to the heater, the pressure roller, and/or the curing station after each one of the layers is transferred to the platen at the transfuse nip, or after a previously established number of the layers are transferred to the platen at the transfuse nip.

Such methods can also move the platen to a support material removal station positioned and apply a different solvent (one that dissolves the support material without affecting the UV curable build material) to leave the 3-D structure made of only the UV curable build material.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 22 is chart illustrating engineering plastics and solvent compatibilities.

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the thermal management is a challenge because of the high temperatures used to transfuse the material from the ITB to a platen, where the ITB is cooled before returning to the development device(s). Additionally, with 3-D printing that uses electrostatic processes, the mechanical integrity of the printed material may be compromised if it is very thin, and the transfer process can impose stripping shear forces that damage the material.

In order to address such issues, once the latent image has been transferred to the ITB, the image is treated with a solvent causing the build particles to become sticky and bond together whereas the support material is minimally affected by the solvent. The solvent treatment step can be in the form of spray, vapor etc. Exposure to the solvent is controlled by controlling the dwell time the latent image is exposed to the solvent. In parallel, a second solvent treatment to the previously transfused stack is optional to also make the top layer in the stack tacky. This is accomplished by translating the build platform (having at least one previously transfused developed layer thereon) under a second solvent treatment zone similar to that provided to the developed layer. After the solvent exposure is completed the build part and IBT are register in the transfuse nip, where the build material is transferred to the surface of the build part.

Therefore, this disclosure presents methods to form 3-D printed objects using a cold transfer and fuse process to stack (layer by layer) multiple dry powder latent images formed from a traditional electrostatic printer. Using this cold fuse device and process eliminates the complicated heat management and high heat tolerant component solutions that are used by traditional fuse processes (that use heat and pressure). Also, these methods and devices eliminate printed object warping caused by heat gradients experienced in traditional high-heat devices.

Figure 1:
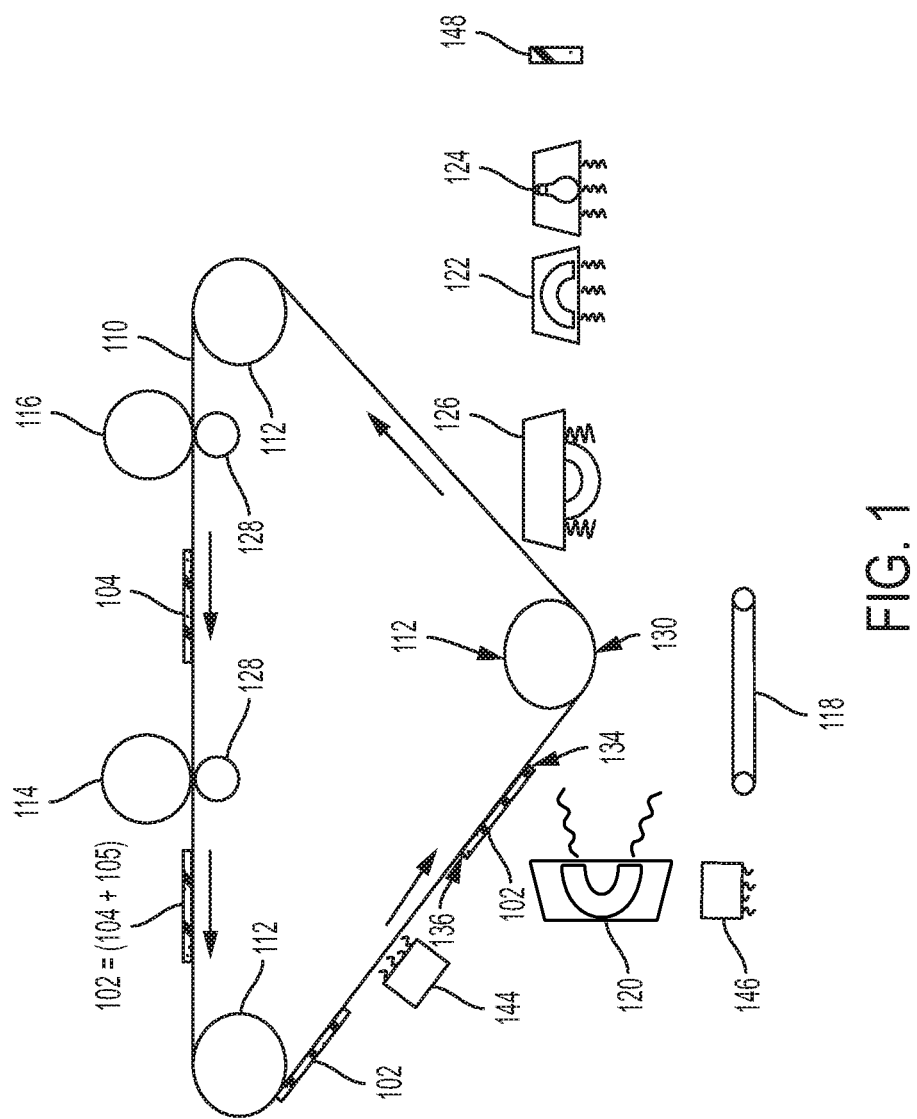
FIGS. 1-18 are schematic cross-section diagrams partially illustrating printing devices herein.

As shown, for example, in FIG. 1, exemplary three-dimensional (3-D) printers herein include, among other components, an intermediate transfer belt 110 (ITB) supported on rollers 112, a first printing component (e.g., development device 116), and a second printing component (e.g., development device 114). Thus, as shown in FIG. 1, the first printing component 116 is positioned to electrostatically transfer (by way of charge difference between the belt (produced by charge generator 128, for example) and the material being transferred) a first material 104, the build material, such as a (potentially dry) powder polymer-wax material (e.g., charged 3-D toner) to the ITB 110. The second printing component 114 (which can also be, for example, a photoreceptor) is also positioned to electrostatically transfer a second material 105 (e.g., the support material, again such as a powder polymer-wax material (e.g., charged 3-D toner)) to a location of the ITB 110 where the first material 104 is located on the ITB 110.

The support material 105 dissolves in solvents that do not affect the build material 104, to allow the printed 3-D structure 104 to be separated from the support material 105 after the full 3-D item is complete. In the drawings, the combination of the build material 104 and the support material 105 is shown as element 102, and is sometimes referred to as a "developed layer." The developed layer 102 of the build material 104 and the support material 105 is on a discrete area of the ITB 110 and is in a pattern corresponding to the components of the 3-D structure in that layer (and its associated support elements), where the 3-D structure is being built, developed layer 102 by developed layer 102.

Also, these structures include one or more solvent application stations 144, 146. One solvent application station 144 is positioned adjacent the ITB 110 so as to expose the layers 102 on the ITB 110 to a solvent. The solvent used in the solvent application station 144 is selected to make the build material 104 tacky, without affecting the support material 105.

Additionally, a platen 118 (which can be a surface or belt) is adjacent the ITB 110. In this example, the platen 118 is a vacuum belt. Patterned layers 102 of build and support material are transferred from the development devices 114, 116 to the intermediate transfer belt 110, and eventually to the platen 118 at a transfuse station 130. The solvent applied at the solvent application station 144 forms bonds between polymers of the build material 104, without affecting the support material 105, and this makes the layers 102 tacky after exposure to the solvent, and promotes transfer of the layers from the ITB 110 to the existing layers 102 on the platen 118, as shown in later drawings.

As shown in FIG. 1, the transfuse station 130 is adjacent the ITB 110. The transfuse station 130 includes a roller 112, on one side of the ITB 110, supporting the ITB 110. The transfuse station 130 is positioned to receive the layers 102 after exposure to the solvent, as the ITB 110 moves from the solvent application station 144 to the transfuse station 130. More specifically, the build material development station 116 the support material development station 114, the solvent application station 144, and the transfuse station 130 are positioned relative to the ITB 110 such that a layer 102 on the ITB 110, when the ITB 110 is moving in a process direction, first passes the build material and support material development stations 114, 116, then passes the solvent application station 144, and then passes the transfuse station 130.

As further shown in FIG. 1, such structures can include heaters 120, 126 and a bonding station 122, 124. The bonding station 122, 124 is positioned to apply light (e.g. UV light) using a light source 124 and/or heat using a heater 122. The structure can also include a support material removal station 148 that is discussed below.

Figure 2:
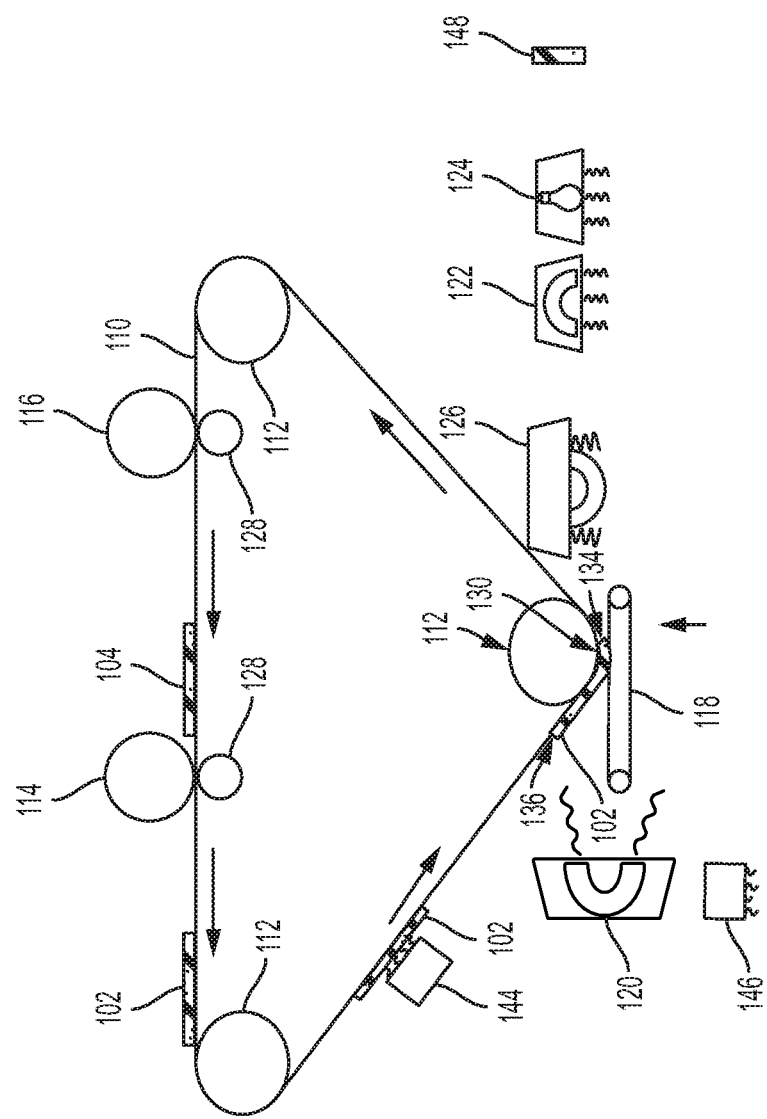

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. As noted above, the solvent applied at the solvent application station 144 forms bonds between polymers of the build material 104, without affecting the support material 105, and this makes the layers 102 tacky after exposure to the solvent. While the solvent application station 144 can be used without heat, the developed layer 102 and ITB 110 can optionally be locally heated by heater 120 to further help bring the developed layer 102 to a "tacky" state prior to transfuse. In one example, the developed layer 102 can be heated to a temperature higher than the glass transition temperature (Tg) but short of the melt or fuse temperature Tm of the toner resin to become tacky.

The platen 118 can also optionally be heated by heater 120 to approximately the same temperature, and then be contacted synchronously with the tacky layer 102 as it translates through the ITB-platen nip (the transfuse nip 130). Thereby, the ITB 110 transfers one of the developed layer 102 of the build material 104 and the support material 105 to the platen 118 each time the platen 118 contacts the ITB 110, to successively form developed layers 102 of the build material 104 and the support material 105 on the platen 118.

Again, the heater 120 can be eliminated to allow the solvent within the solvent application station 144 to be the only element that makes the developed layer 102 tacky. Further, if the heater 120 is used to heat the developed layer 102 and/or the ITB 110, the amount of heating performed to create a tacky developed layer 102 is less heat then would be utilized to make the develops later 102 tacky in the absence of any of solvent treatment. Therefore, the solvent can be used alone to make the developed layer 102 tacky, and if the heater 120 is utilized in combination with the solvent application station 144 to achieve a tacky consistency, the amount of heat that is utilized will be less than without the solvent application station 144.

Therefore, the build and support material that is printed in a pattern on the ITB by each separate development device 114, 116, is combine together in the developed layers 102 to represent a specific pattern having a predetermined length. Thus, as shown in FIG. 2, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse nip 130, the leading edge 134 of the developed layer 102 within the transfuse nip 130 begins to be transferred to a corresponding location of the platen 118. Thus, in FIG. 2, the platen 118 moves to contact the developed layer 102 on the ITB 110 at a location where the leading edge 134 of the developed layer 102 is at the lowest location of the roller of the transfuse nip 130. Thus, in this example, the trailing edge 136 of the developed layer 102 has not yet reached the transfuse nip 130 and has not, therefore, yet been transferred to the platen 118.

Figure 3:
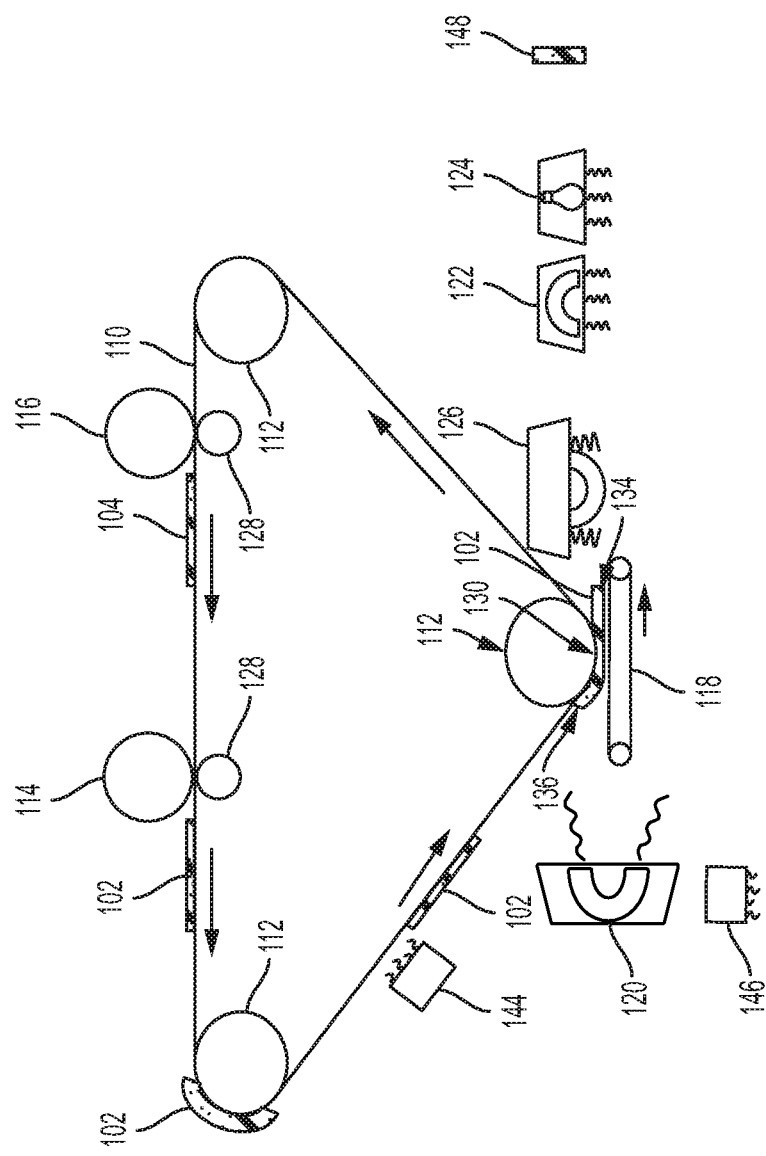

As shown in FIG. 3, the platen 118 moves synchronously with the ITB 110 (moves at the same speed and the same direction as the ITB 110) either by moving or rotating the platen vacuum belt, to allow the developed layers 102 to transfer cleanly to the platen 118, without smearing. In FIG. 3, the trailing edge 136 of the developed layer 102 is the only portion that has not yet reached the transfuse nip 130 and has not, therefore, been transferred to the platen 118. Then, as the ITB 110 moves in the processing direction, the platen 118 moves at the same speed and in the same direction as the ITB 110, until the trailing edge 136 of the developed layer 102 reaches the bottom of the roller of the transfuse nip 130, at which point the platen 118 moves away from the ITB 110 and over to the heater 126, as shown in FIG. 4 (the heater 126 can be a non-contact (e.g., infrared (IR) heater, or a pressure heater, such as a fuser roller).

Figure 4:
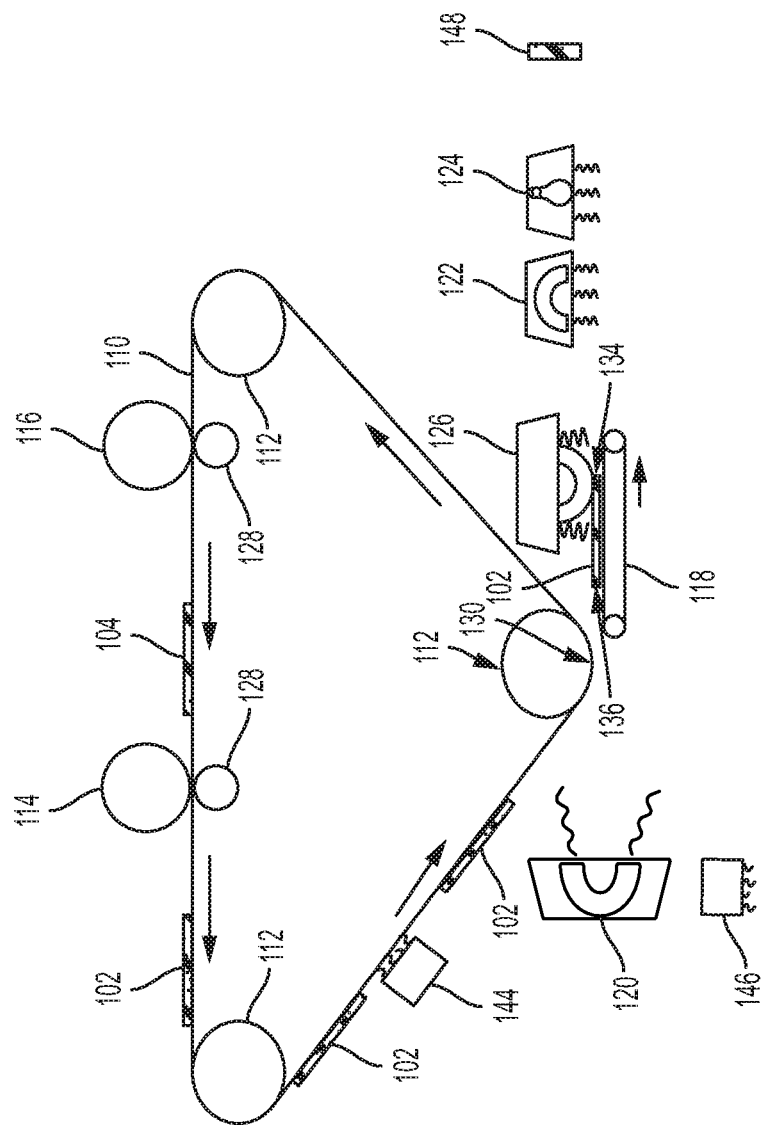
Figure 5:
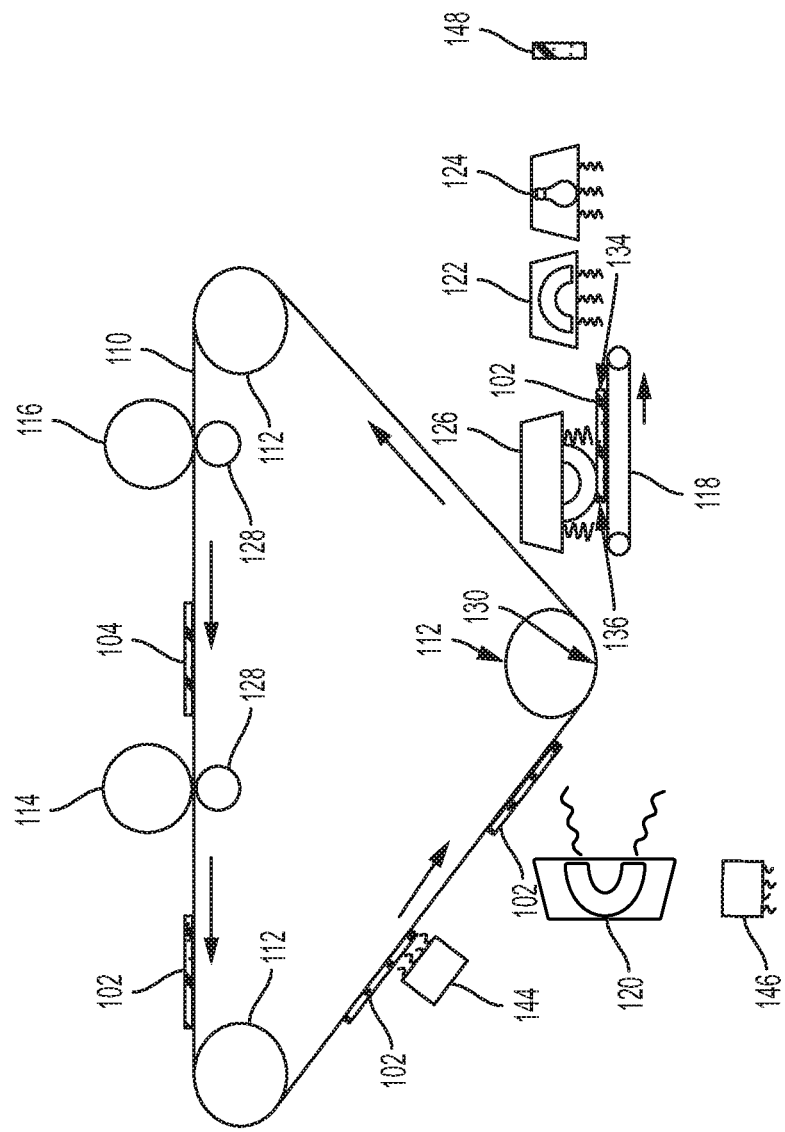

As shown in FIGS. 4 and 5, if the heater 126 is a pressure roller, the platen 118 moves synchronously as the roller rotates, heating and pressing to fuse the developed layer 102 to the platen 118. This synchronous movement between the platen 118 and the ITB 110 (and heater roller 126) causes the pattern of support and builds materials (102) that are printed by the development devices 116, 114 to be transferred precisely from the ITB 110 to the platen 118, without distortion or smearing.

The platen 118 can move to the heater 126 and bonding station 122, 124 after each time the ITB 110 transfers each of the developed layers 102 to the platen 118 to independently heat each of the developed layers 102 and successively join each the developed layer 102 to the platen 118 and to any previously transferred developed layers 102 on the platen 118. In other alternatives, the platen 118 may only move to the heater 126 and bonding station 122, 124 after a specific number (e.g., 2, 3, 4, etc.) of the developed layers 102 have been placed on the platen 118 to allow multiple developed layers 102 to be simultaneously fused to the platen 118 and to each other.

Figure 6:
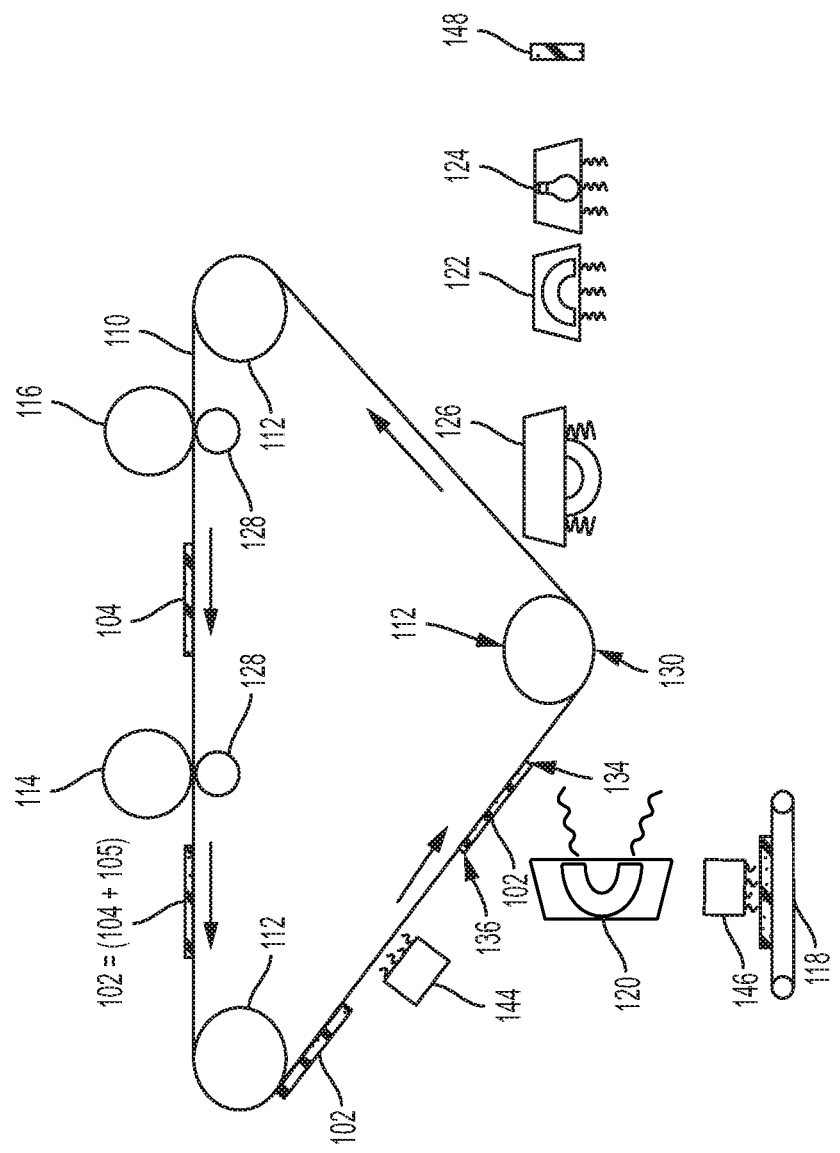

Before returning to the transfuse station 130 to acquire the next developed layer 102, as shown in FIG. 6, the platen 118 can optionally move to the second solvent application station 146. This allows the second solvent application station 146 to apply the same (or possibly different) solvent to the top developed layer 102 on the platen 118 to make the top developed layer 102 on the platen 118 tacky. Then, when the tacky developed layer 102 on the platen 118 moves to the transfuse station 130 to acquire the next tacky developed layer 102 on the ITB 110, the tackiness of both layers promotes transfer of the developed layer 102 from the ITB 110 to the existing layers 102 on the platen 118.

Figure 7:
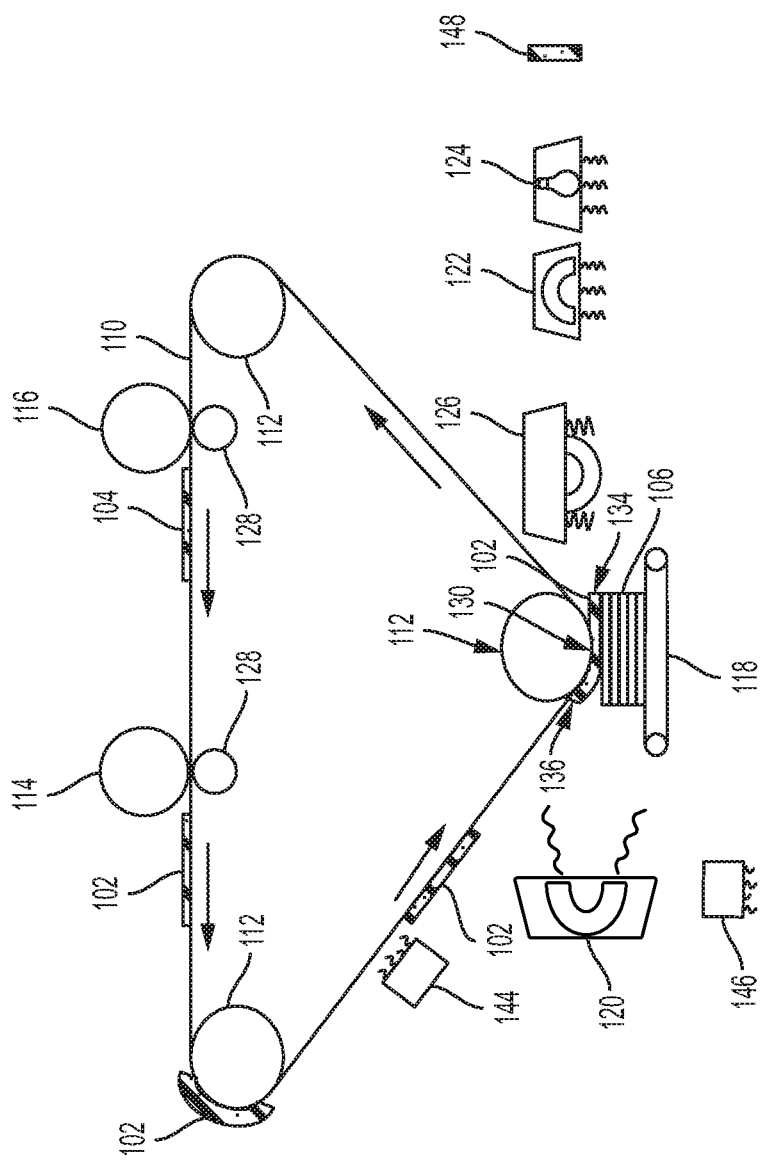
Figure 8:
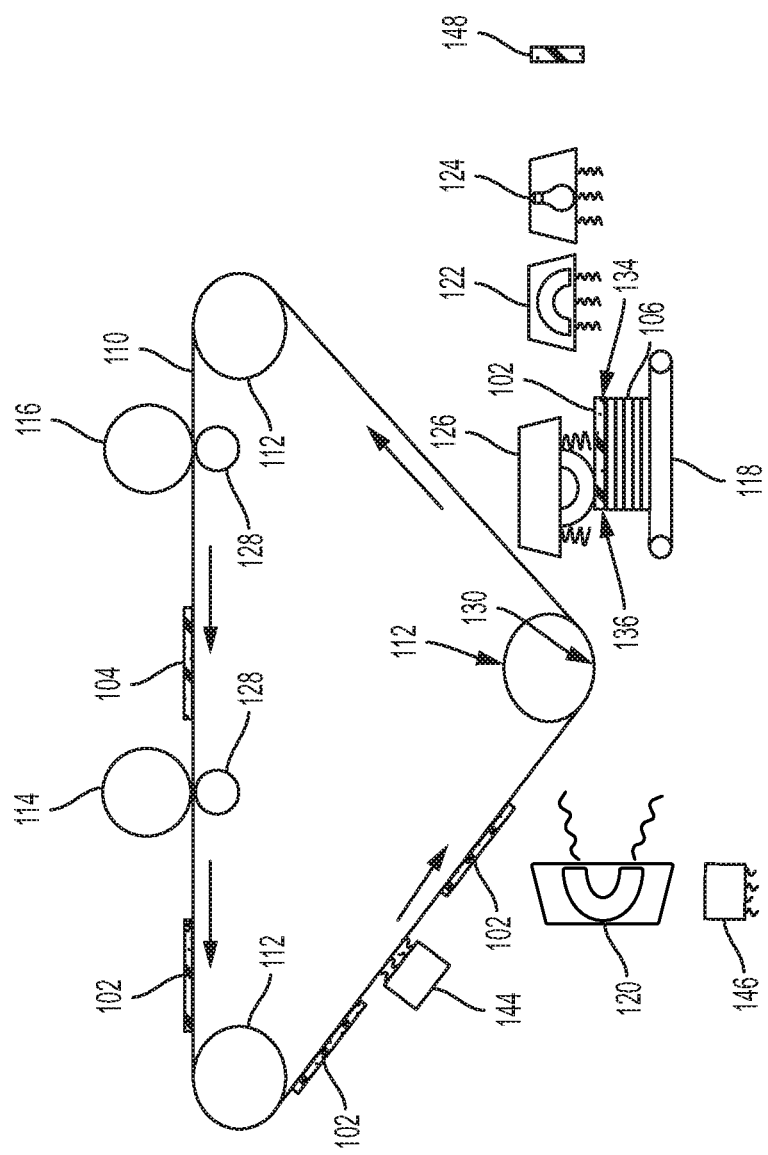

Thus, the processing in FIGS. 2-6 is repeated to fuse multiple developed layers 102 into a stack 106, as shown in FIG. 7. As the stack 106 of the developed layers 102 grows, additional developed layers 102 are formed on top of the stack 106, as shown in FIG. 7, and such additional developed layers 102 are pressure heated by the heater 126, as shown in FIG. 8, to fuse all the develop layers 102 within the stack 106 together.

Figure 9:
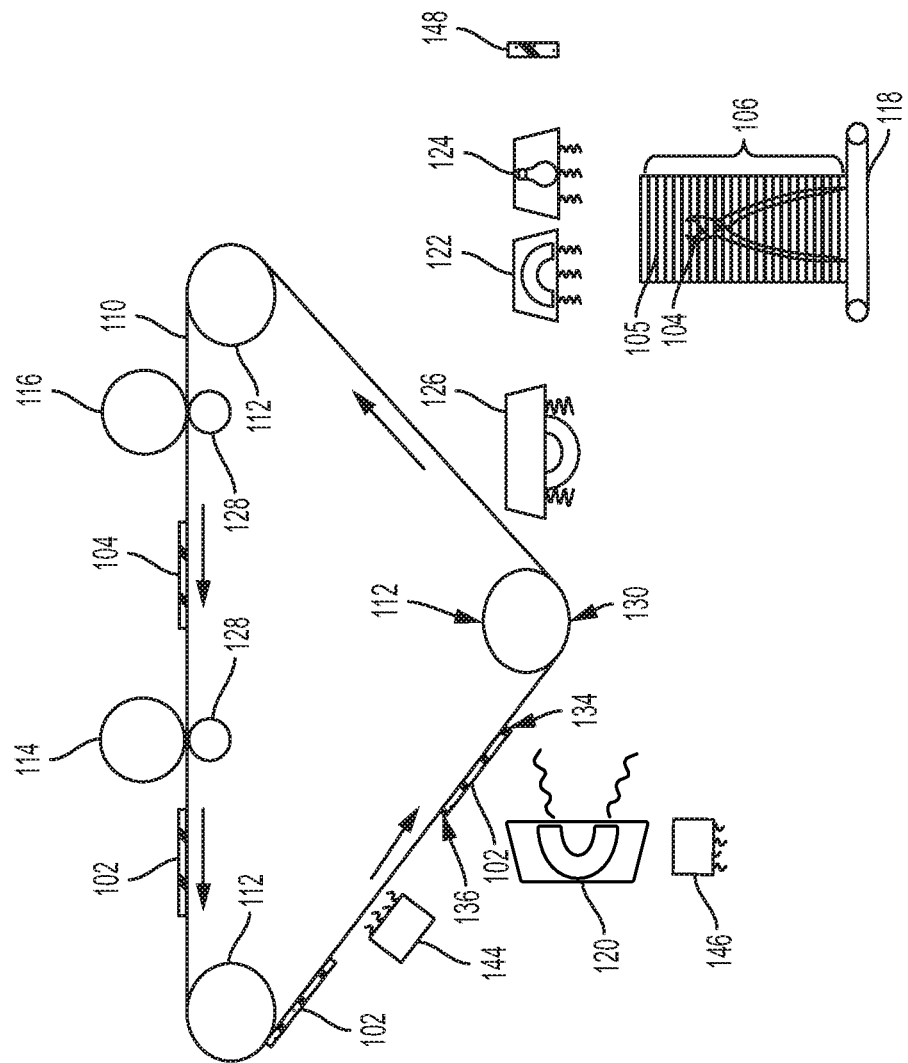

As shown in FIG. 9, the bonding station 122, 124 is configured to apply light and/or heat to the 3-D structure to bond/cure the developed layers 102 in the freestanding stack 106. The selective use of heaters, lights, and other components 122, 124 of the bonding station will vary depending upon the chemical makeup of the developed layers 102.

In one example, the build material 104 can include UV curable toners. Therefore, as shown in FIG. 9, in one example the bonding station 122, 124 can bond such materials 102 by heating the materials 102 to a temperature between their glass transition temperature and their melting temperature, and then applying UV light to cross-link the polymers within the materials 102, thereby creating a rigid structure. Those ordinarily skilled in the art would understand that other build and support materials would utilize other bonding processing and bonding components, and that the foregoing is presented only as one limited example; and the devices and methods herein are applicable to all such bonding methods and components, whether currently known or developed in the future.

In one example, the bonding station 122, 124 can apply such light and/or heat potentially after each time the ITB 110 transfers each of the developed layers 102 to the platen 118, or less frequently such as only once (e.g., when the entire stack 106 is completely formed). In addition, FIG. 9 illustrates an overlay showing portions of support material 105 and build material 104 within the accumulation of the freestanding stack 106. Such may or may not be visible, and is only illustrated to show one exemplary way in which such build and support materials may be arranged.

Figure 10:
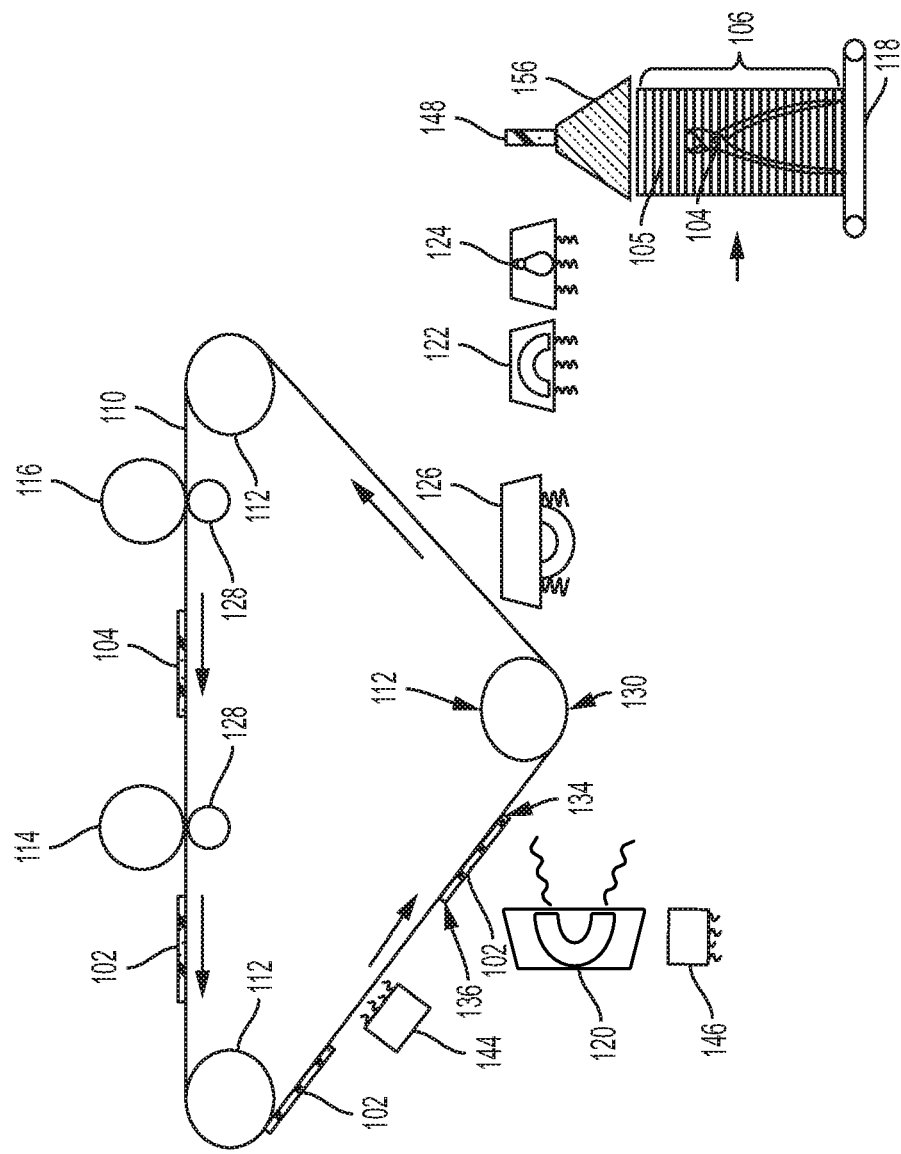
Figure 11:
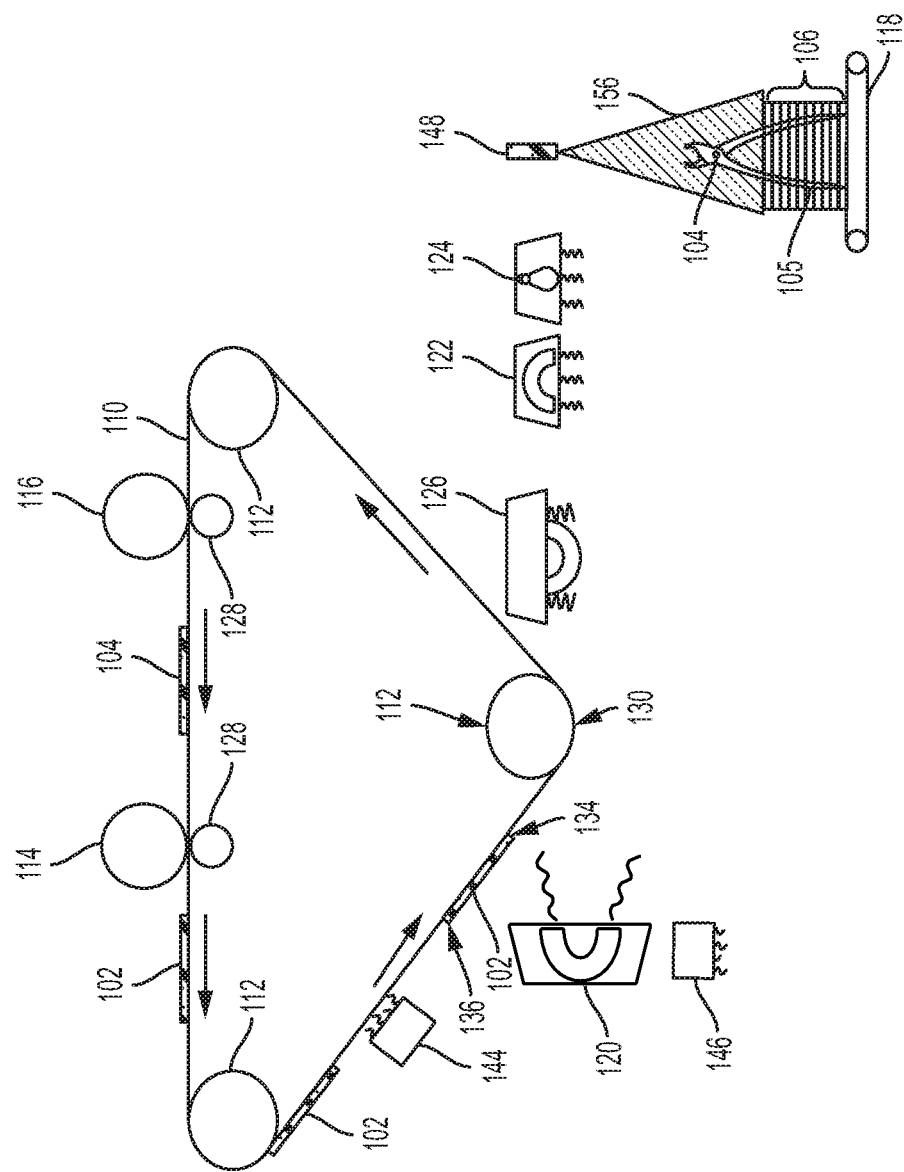
Figure 12:
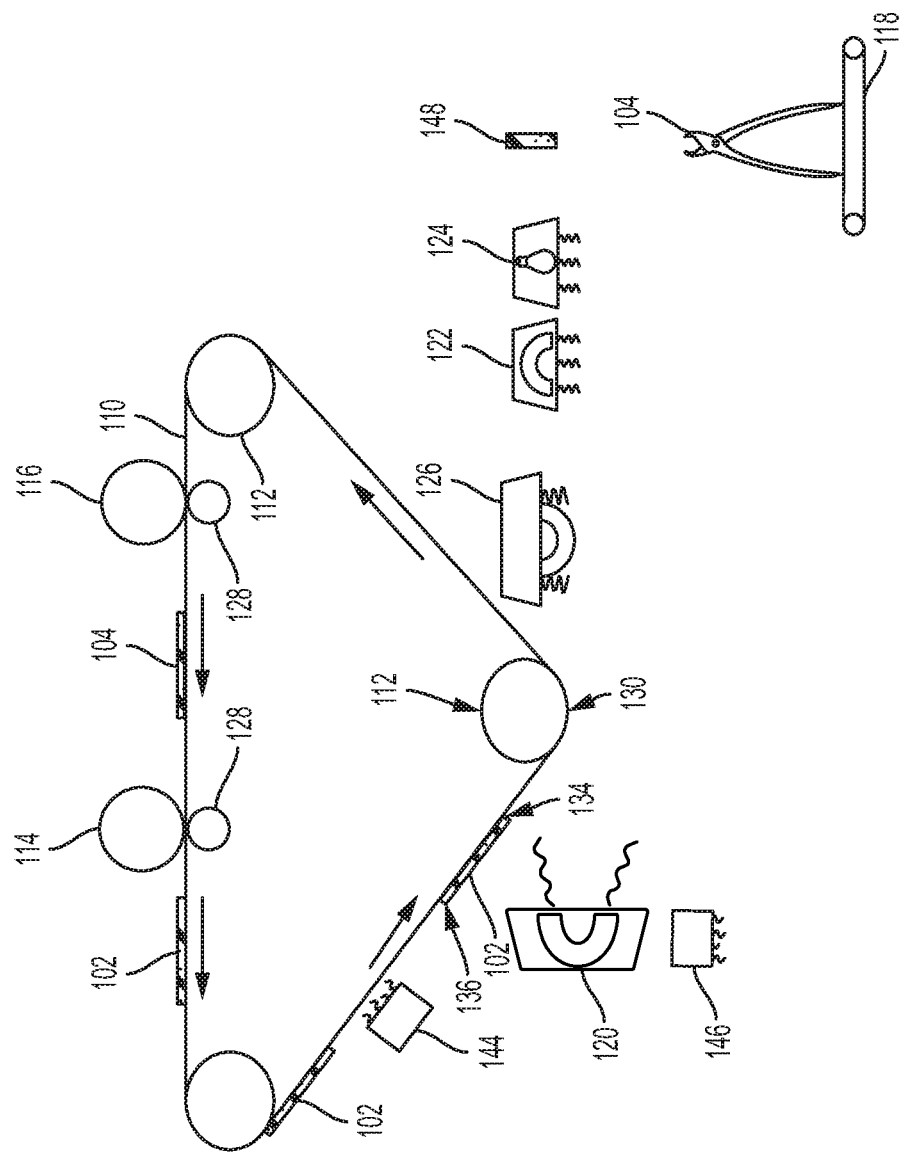

The 3-D structure of the freestanding stack 106 can be output to allow manual removal of the support material 105 using an external solvent bath; or processing can proceed as shown in FIG. 10-12. More specifically, in FIG. 10, the support material removal station 148 is positioned to receive the now bonded 3-D freestanding stack 106 on the platen 118. The support material removal station 148 applies a solvent 156 that is different than the solvent within the solvent application stations 144, 146. The solvent applied by the support material removal station 148 is selected to dissolve the support material 105 without affecting the build material 104. Again, as noted above, the solvent utilized will depend upon the chemical makeup of the build material 104 and the support material 105. FIG. 11 illustrates the processing where about half of the support material 105 remains, and a portion of the build material 104 protrudes from the remaining stack of support material 105. FIG. 12 illustrates processing after the support material removal station 148 has applied sufficient solvent 156 to dissolve all the support material 105, leaving only the build material 104 remaining, which leave a completed 3-D structure made of only the build material 104.

Figure 13:
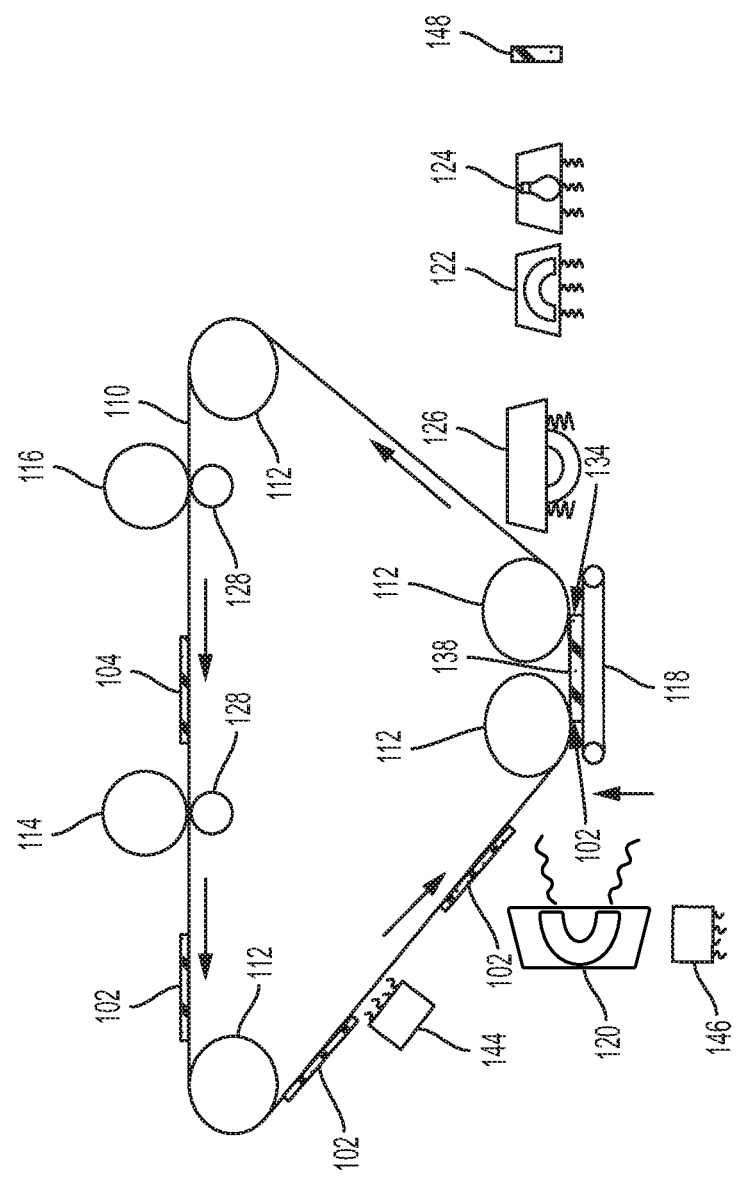
Figure 14:
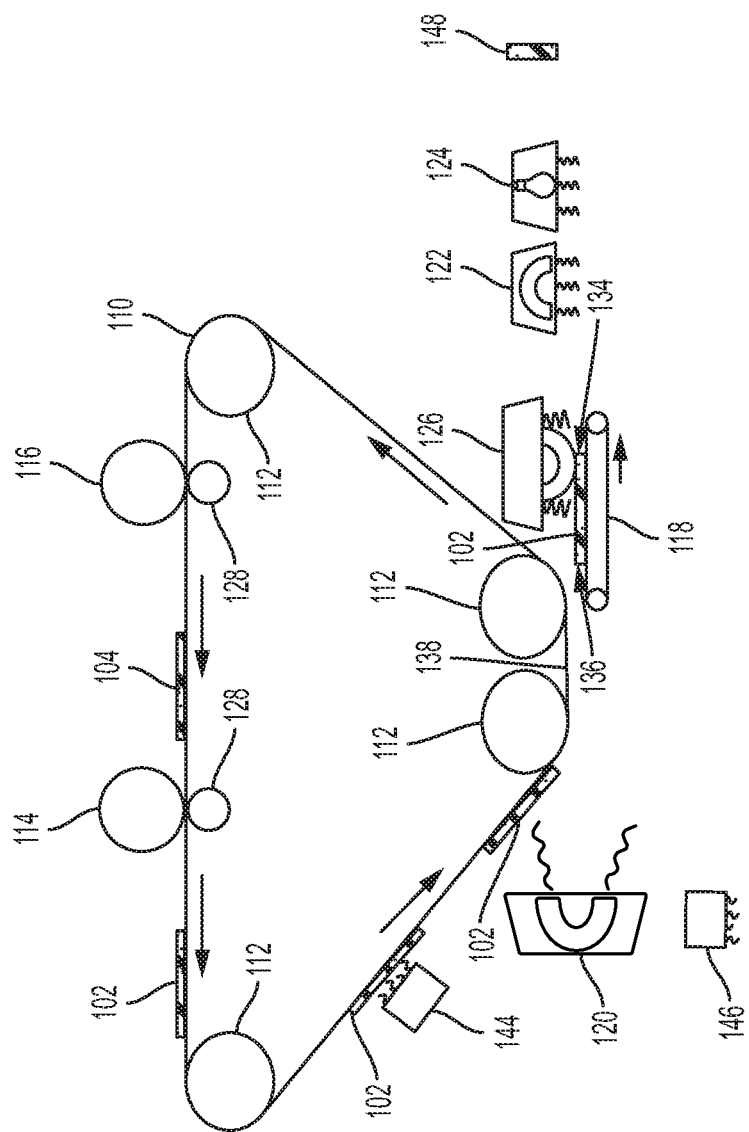
Figure 15:
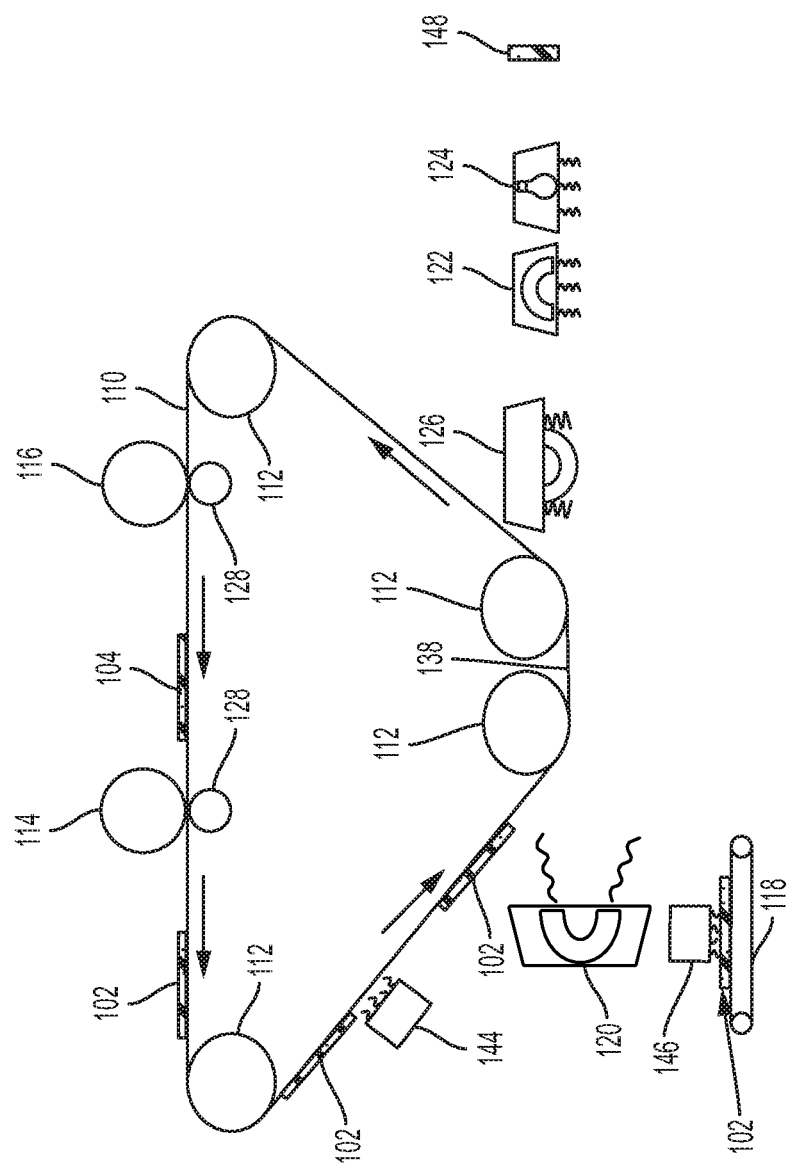

FIGS. 13-15 illustrate an alternative 3-D electrostatic printing structure herein which includes a planar transfuse station 138 in place of the transfuse nip 130 shown in FIG. 1. As shown in FIG. 13, the planar transfuse station 138 is a planar portion of the ITB 110 that is between rollers 112 and is parallel to the platen 118. As shown in FIG. 14, with this structure, when the platen 118 moves to contact the planar transfuse station 138, all of the developed layer 102 is transferred simultaneously to the platen 118 or partially formed stack 106, avoiding the rolling transfuses process shown in FIGS. 2 and 3. FIG. 15 shows that the second solvent application station 146 can be used to make the top developed layer 102 on the platen 118 tacky.

Figure 16:
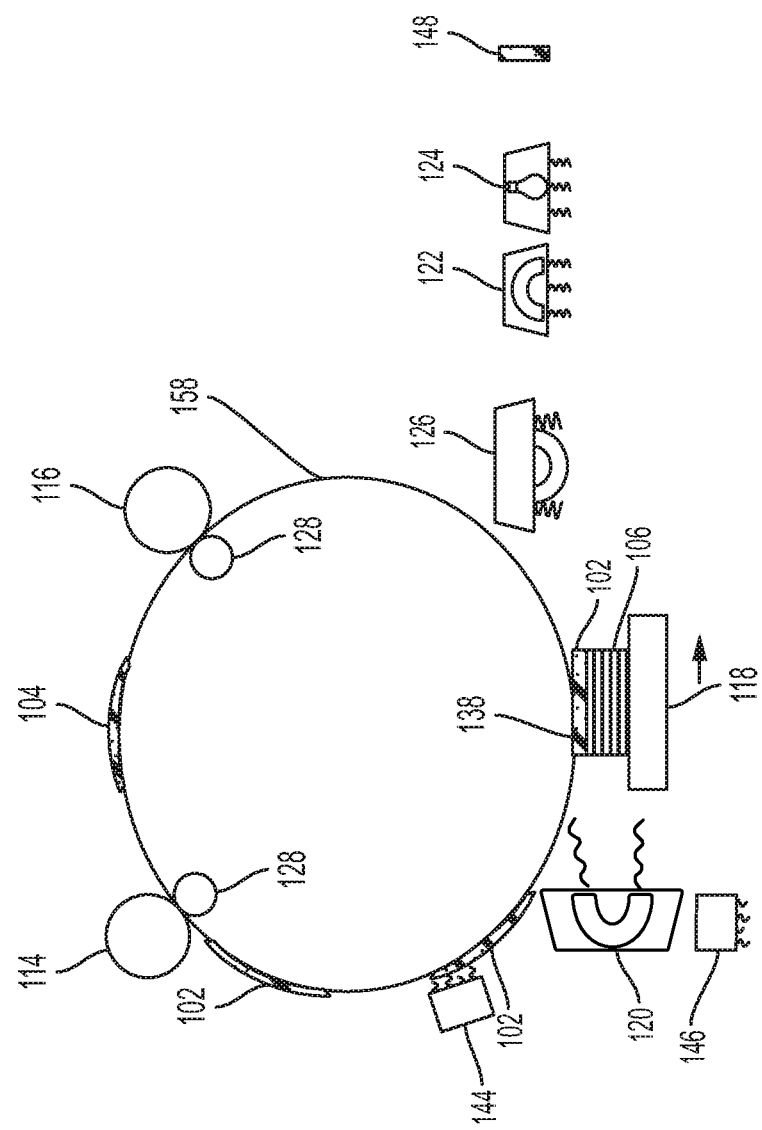

Similarly, as shown in FIG. 16, a drum 158 could be used in place of the ITB 110, with all other components operating as described herein. Thus, the drum 158 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 17:
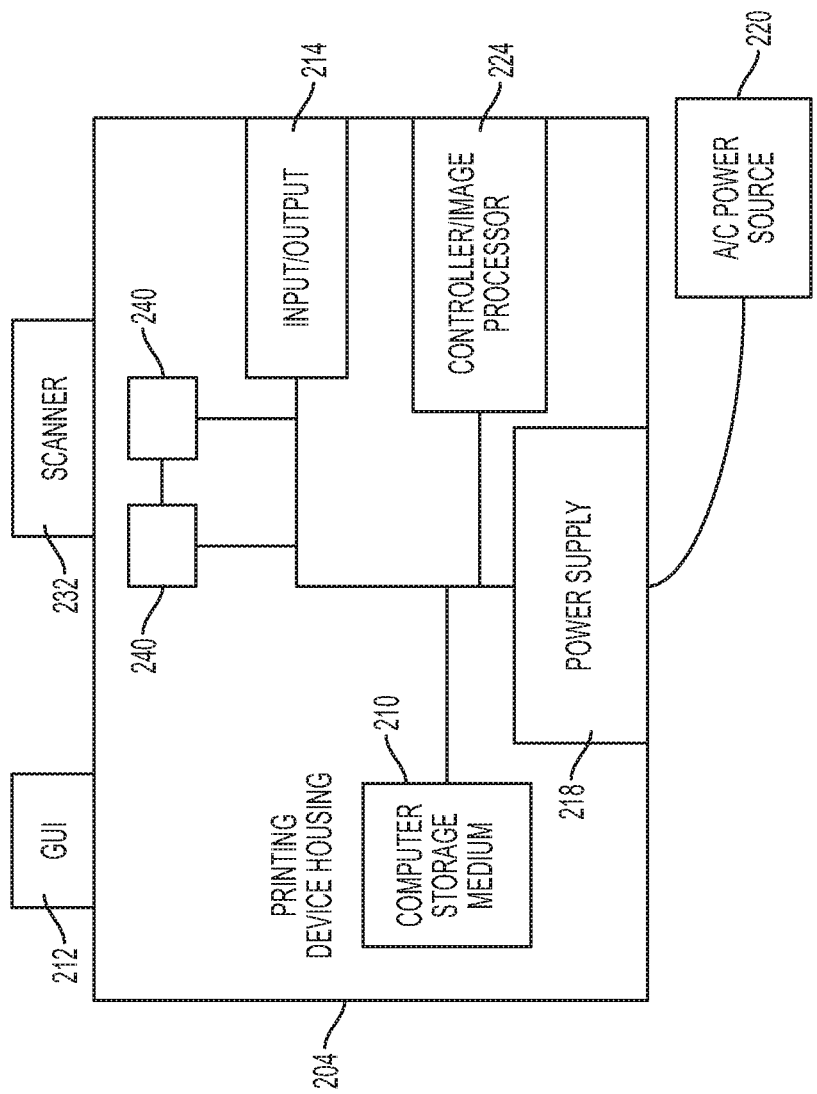

FIG. 17 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 17, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 18:
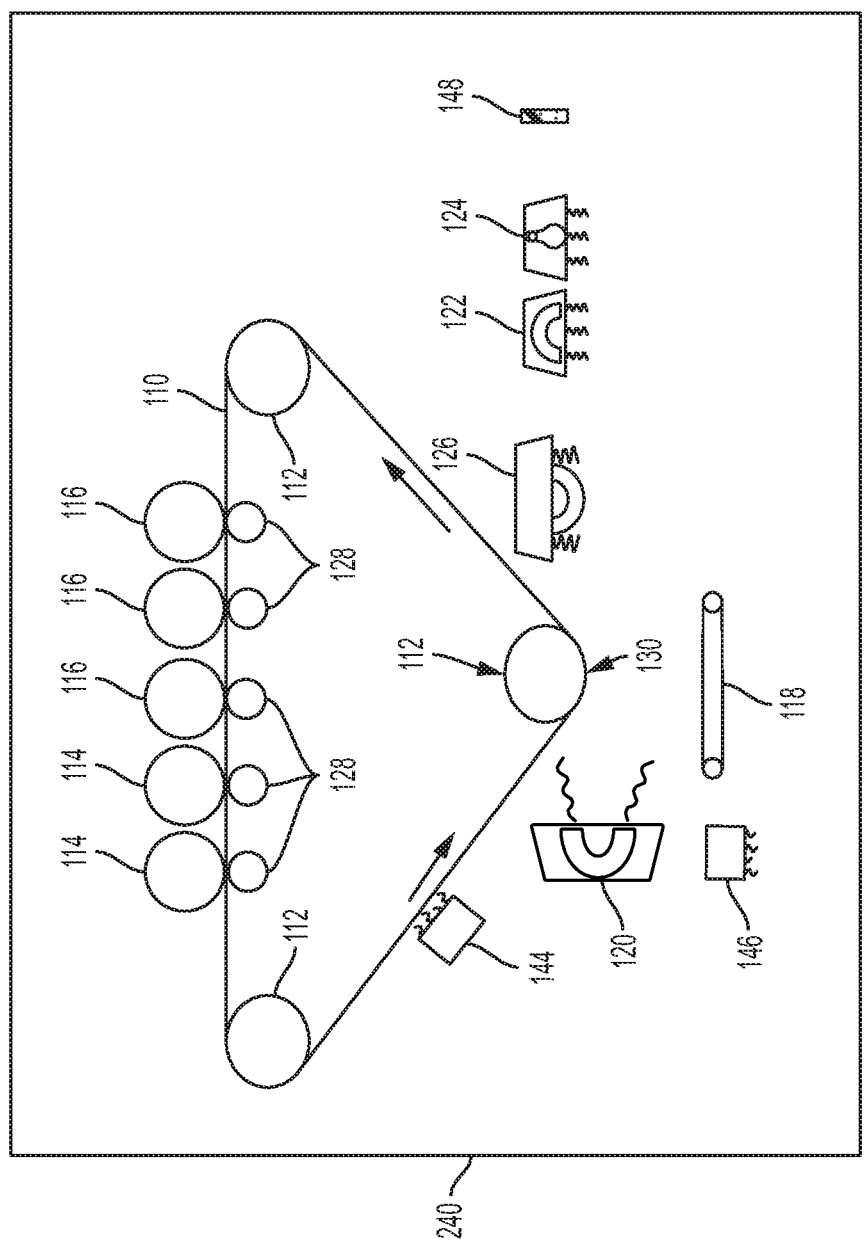

The one or more printing engines 240 are intended to illustrate any marking device that applies build and support materials (toner, etc.) whether currently known or developed in the future and can include, for example, devices that use an intermediate transfer belt 110 (as shown in FIG. 18).

Thus, as shown in FIG. 18, each of the printing engine(s) 240 shown in FIG. 17 can utilize one or more potentially different (e.g., different color, different material, etc.) build material development stations 116, one or more potentially different (e.g., different color, different material, etc.) support material development stations 114, etc. The development stations 114, 116 can be any form of development station, whether currently known or developed in the future, such as individual electrostatic marking stations, individual inkjet stations, individual dry ink stations, etc. Each of the development stations 114, 116 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 18 illustrates five development stations adjacent or in contact with a rotating belt (110), as would be understood by those ordinarily skilled in the art, such devices could use any number of marking stations (e.g., 2, 3, 5, 8, 11, etc.).

Figure 19:
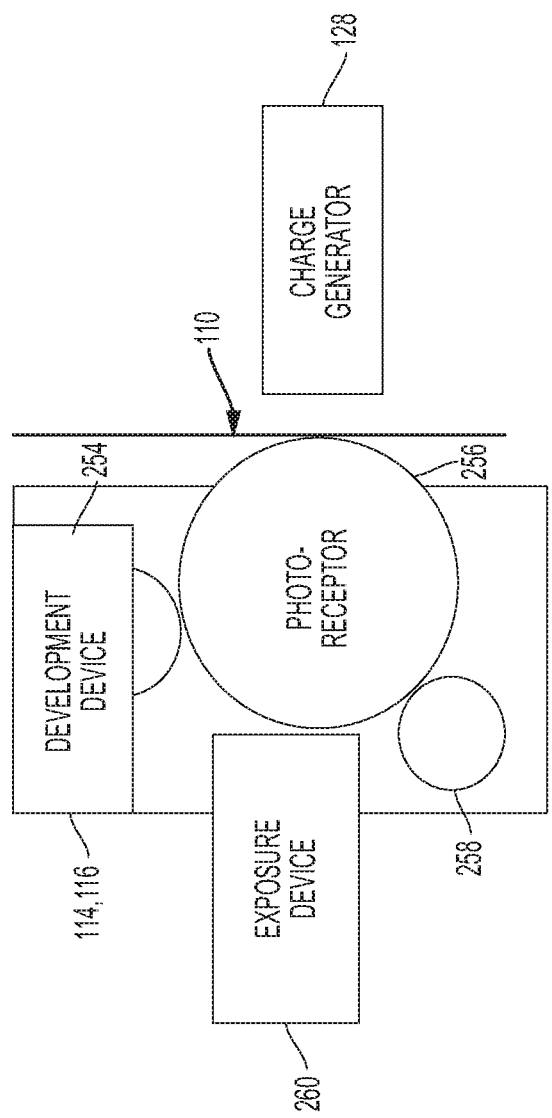
FIG. 19 is an expanded schematic diagram illustrating a development device herein.

One exemplary individual electrostatic development station 114, 116 is shown in FIG. 19 positioned adjacent to (or potentially in contact with) intermediate transfer belt 110. Each of the individual electrostatic development stations 114, 116 includes its own charging station 258 that creates a uniform charge on an internal photoreceptor 256, an internal exposure device 260 that patterns the uniform charge into a latent image of charge, and an internal development device 254 that transfers build or support material to the photoreceptor 256 in a pattern matching the charge latent image. The pattern of build or support material is then drawn from the photoreceptor 256 to the intermediate transfer belt 110 by way of an opposite charge of the intermediate transfer belt 110 relative to the charge of the build or support material, that is usually created by a charge generator 128 on the opposite side of the intermediate transfer belt 110.

Figure 20:
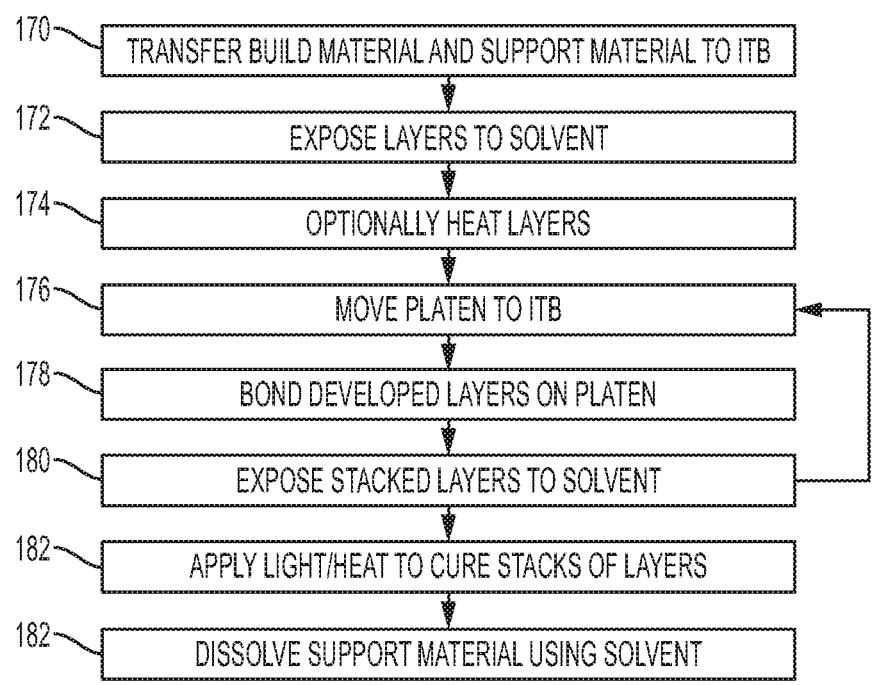
FIG. 20 is flow diagram illustrating operations herein.

FIG. 20 is a flowchart showing processing of methods performed herein. More specifically, such processing beings in item 170 where these methods electrostatically transfer build and support material to the intermediate transfer surface using the build material and support material development stations. These processes transfer layers of build material and support material to the intermediate transfer surface, where each of the layers is on a discrete area of the ITB and is in a pattern.

In item 172, such methods expose the layers of build and support material on the intermediate transfer surface to a solvent using a solvent application station to make the build material tacky, without affecting the support material. Additionally, the developed layer and previously transferred layers can be optionally heated to promote tackiness of the layers in item 174.

Then, prior to transfusing at the transfuse nip, such methods move the intermediate transfer surface past the transfuse station (again, the transfuse station is positioned to receive the layers after exposure to the solvent) and move the platen relative to the intermediate transfer surface to contact the platen to one of the layers on the intermediate transfer surface, in item 176. The intermediate transfer surface transfers a layer of the build material and the support material to the platen each time the platen contacts the layers on the intermediate transfer surface at the transfuse station in item 176, to successively form a freestanding stack of the layers of build and support material on the platen. The solvent forms bonds between polymers of the build material, without affecting the support material, and the layers being tacky after exposure to the solvent (and optional heat) promotes transfer of the layers from the intermediate transfer surface to the layers on the platen in item 176.

Such methods can optionally move the platen from the transfuse station to the heater to heat the layers and bond each of the layers together in item 178. Similarly, in item 178, these methods can move the platen to a pressure roller to press each of the layers together. Additionally, in item 180 these methods can apply the same (or different) solvent to the stacked layers on the platen using the second solvent station to also make the top layer on the platen tacky prior to the platen moving to the transfer station.

Item 182 shows these methods curing the stack of developed layers using the curing station. In different configurations, these methods bond the layers using the heater or the pressure roller (178), and/or cure the layers using the curing station (182) after each one of the layers is transferred to the platen at the transfuse nip, or after a previously established number of the layers are transferred to the platen at the transfuse nip. Therefore, groups (potentially all) of developed layers can be bonded (178) and/or cured (182) at the same time, or such bonding and curing can be performed layer-by-layer, and the order of operations shown in FIG. 20 is not strictly followed.

As shown in item 182, such methods can also move the platen to a support material removal station positioned and apply a different solvent (one that dissolves the support material without affecting the UV curable build material) to leave the 3-D structure made of only the UV curable build material.

Figure 21:
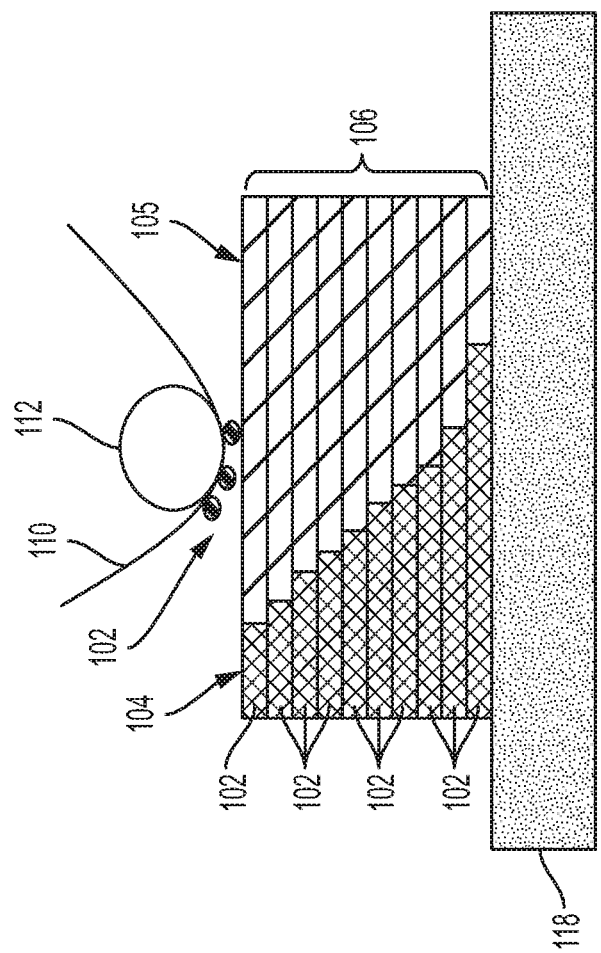
FIG. 21 is an expanded schematic diagram illustrating devices herein.

FIG. 21 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below to form a stack 106 of developed layers 102 on the platen 118. As noted above, the particles of build materials 104 and support material 105 within the developed layer 102 (shown as particles (not drawn to scale) in FIG. 21, using identification number 102) are tacky particles of powder joining a tacky top developed layer 102.

FIG. 22 is chart illustrating engineering plastics and solvent compatibilities. In FIG. 22, A=no attack, possibly slight absorption, negligible effect on mechanical properties; B=slight attack by absorption, some swelling and a small reduction in mechanical likely; C=moderate attack of appreciable absorption, material will have limited life; D=material will decompose or dissolve in a short; *=no data available; and aqueous solutions are shown, the concentration as a weight % is given. The selection of build material, support material and solvent can be chosen such that the solvent affects the build material causing it the dissolve or soften and the support material to resist the solvent. The build material is selected to have the required mechanical properties necessary for the parts use case.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
an intermediate transfer surface;
a build material development station positioned to electrostatically transfer build material to said intermediate transfer surface;
a support material development station positioned to electrostatically transfer support material to said intermediate transfer surface, said build material development station and said support material development station transfer layers of said build material and said support material to said intermediate transfer surface;
a first solvent application station positioned to expose said layers on said intermediate transfer surface to a solvent that makes said layers tacky;
a transfuse station adjacent said intermediate transfer surface, said transfuse station is positioned to receive said layers after exposure to said solvent as said intermediate transfer surface moves past said transfuse station; and
a platen moving relative to said intermediate transfer surface, said intermediate transfer surface transfers a layer of said build material and said support material to said platen each time said platen contacts one of said layers on said intermediate transfer surface at said transfuse station to successively form a freestanding stack of said layers on said platen;
a second solvent application station positioned to apply said solvent to said layers on said platen to make the top layer on said platen tacky prior to said platen moving to said transfuse station;
a heater adjacent said platen, said platen moves from said transfuse station to said heater to heat said layers and join each of said layers together;
a pressure roller adjacent said heater, said platen moves to said pressure roller to press each of said layers together; and
a curing station positioned to apply UV light to said layers to cure said layers.

2. The 3-D printer according to claim 1, said layers being tacky after exposure to said solvent promotes transfer of said layers from said intermediate transfer surface to said layers on said platen.

3. The 3-D printer according to claim 1, said solvent forms bonds between polymers of said build material, without affecting said support material.

4. The 3-D printer according to claim 1, said build material development station, said support material development station, said first solvent application station, and said transfuse station are positioned relative to said intermediate transfer surface such that a point on said intermediate transfer surface, when said intermediate transfer surface moves in a process direction, first passes said build material development station and said support material development station, then passes said first solvent application station, and then passes said transfuse station.

5. A three-dimensional (3-D) printer comprising:
an intermediate transfer belt (ITB);
a build material development station positioned to electrostatically transfer build material to said ITB;
a support material development station positioned to electrostatically transfer support material to a location of said ITB where said build material is located on said ITB, said support material dissolves in different solvents relative to solvents that dissolve said build material, said build material development station and said support material development station transfer layers of said build material and said support material to said ITB, each of said layers is on a discrete area of said ITB and is in a pattern;

a first solvent application station positioned to expose said layers on said ITB to a solvent that makes said layers tacky;

a transfuse station adjacent said ITB, said transfuse station comprises a roller on a first side of said ITB supporting said ITB, said transfuse station is positioned to receive said layers after exposure to said solvent as said ITB moves past said transfuse station; and a platen moving relative to said ITB, said ITB transfers a layer of said build material and said support material to said platen each time said platen contacts one of said layers on a second side of said ITB at said transfuse station to successively form a freestanding stack of said layers on said platen, said first side being opposite said second side;

a second solvent application station positioned to apply said solvent to said layers on said platen to make the top layer on said platen tacky prior to said platen moving to said transfuse station;

a heater adjacent said platen, said platen moves from said transfuse station to said heater to heat said layers and join each of said layers together;

a pressure roller adjacent said heater, said platen moves to said pressure roller to press each of said layers together; and a curing station positioned to apply UV light to said layers to cure said layers.

6. The 3-D printer according to claim 5, said layers being tacky after exposure to said solvent promotes transfer of said layers from said ITB to said layers on said platen.

7. The 3-D printer according to claim 5, said solvent forms bonds between polymers of said build material, without affecting said support material.

8. The 3-D printer according to claim 5, said build material development station, said support material development station, said first solvent application station, and said transfuse station are positioned relative to said ITB such that a point on said ITB, when said ITB moves in a process direction, first passes said build material development station and said support material development station, then passes said first solvent application station, and then passes said transfuse station.

9. A three-dimensional (3-D) printer comprising:
an intermediate transfer belt (ITB);
a build material development station positioned to electrostatically transfer ultraviolet (UV) curable build material to said ITB;
a support material development station positioned to electrostatically transfer support material to a location of said ITB where said UV curable build material is located on said ITB, said support material dissolves in different solvents relative to solvents that dissolve said UV curable build material, said build material development station and said support material development station transfer layers of said UV curable build material and said support material to said ITB, each of said layers is on a discrete area of said ITB and is in a pattern;

a first solvent application station positioned to expose said layers on said ITB to a solvent that makes said build material tacky, without affecting said support material;

a transfuse station adjacent said ITB, said transfuse station comprises a roller on a first side of said ITB supporting said ITB, said transfuse station is positioned to receive said layers after exposure to said solvent as said ITB moves past said transfuse station;

a platen moving relative to said ITB, said ITB transfers a layer of said UV curable build material and said support material to said platen each time said platen contacts one of said layers on a second side of said ITB at said transfuse station to successively form a freestanding stack of said layers on said platen, said first side being opposite said second side;

a second solvent application station positioned to apply said solvent to said layers on said platen to make the top layer on said platen tacky prior to said platen moving to said transfuse station;

a heater adjacent said platen, said platen moves from said transfuse station to said heater to heat said layers and join each of said layers together;

a pressure roller adjacent said heater, said platen moves to said pressure roller to press each of said layers together; and a curing station positioned to apply UV light to said layers to cure said layers.

10. The 3-D printer according to claim 9, said layers being tacky after exposure to said solvent promotes transfer of said layers from said ITB to said layers on said platen.

11. The 3-D printer according to claim 9, said solvent forms bonds between polymers of said build material, without affecting said support material.

12. The 3-D printer according to claim 9, said build material development station, said support material development station, said first solvent application station, and said transfuse station are positioned relative to said ITB such that a point on said ITB, when said ITB moves in a process direction, first passes said build material development station and said support material development station, then passes said first solvent application station, and then passes said transfuse station.

13. A three-dimensional (3-D) printer comprising:
an intermediate transfer surface;
a build material development station specifically configured to maintain build material comprising a first polymer, said build material development station being positioned to electrostatically transfer said build material to said intermediate transfer surface;
a support material development station specifically configured to maintain support material comprising a second polymer different from said first polymer, said support material development station being positioned to electrostatically transfer said support material to said intermediate transfer surface, said build material development station and said support material development station transfer layers of said build material and said support material to said intermediate transfer surface;
a first solvent application station specifically configured to maintain a solvent that forms bonds between said first polymers of said build material without affecting said second polymers of said support material, said first solvent application station being positioned to expose said layers on said intermediate transfer surface to said solvent to make said layers tacky;
a transfuse station adjacent said intermediate transfer surface, said transfuse station is positioned to receive said layers after exposure to said solvent as said intermediate transfer surface moves past said transfuse station; and a platen moving relative to said intermediate transfer surface, said intermediate transfer surface transfers a layer of said build material and said support material to said platen each time said platen contacts one of said layers on said intermediate transfer surface at said transfuse station to successively form a freestanding stack of said layers on said platen;

a second solvent application station positioned to apply said solvent to said layers on said platen to make the top layer on said platen tacky prior to said platen moving to said transfuse station;

a heater adjacent said platen, said platen moves from said transfuse station to said heater to heat said layers and join each of said layers together;

a pressure roller adjacent said heater, said platen moves to said pressure roller to press each of said layers together; and a curing station positioned to apply UV light to said layers to cure said layers.

14. The 3-D printer according to claim 13, said layers being tacky after exposure to said solvent promotes transfer of said layers from said intermediate transfer surface to said layers on said platen.

15. The 3-D printer according to claim 13, said build material development station, said support material development station, said first solvent application station, and said transfuse station are positioned relative to said intermediate transfer surface such that a point on said intermediate transfer surface, when said intermediate transfer surface moves in a process direction, first passes said build material development station and said support material development station, then passes said first solvent application station, and then passes said transfuse station.

16. The 3-D printer according to claim 13, said intermediate transfer surface being configured to bond said first polymer of said layer on said intermediate transfer surface to said first polymer of said layer on said platen without bonding said second polymer when transferring said layer of said build material and said support material.

17. The 3-D printer according to claim 13, said first solvent application station being configured to expose said layers on said intermediate transfer surface to said solvent in parallel with said second solvent application station applying said solvent to said layers on said platen.

18. The 3-D printer according to claim 1, said first solvent application station being configured to expose said layers on said intermediate transfer surface to said solvent in parallel with said second solvent application station applying said solvent to said layers on said platen.

19. The 3-D printer according to claim 5, said first solvent application station being configured to expose said layers on said intermediate transfer surface to said solvent in parallel with said second solvent application station applying said solvent to said layers on said platen.

20. The 3-D printer according to claim 9, said first solvent application station being configured to expose said layers on said intermediate transfer surface to said solvent in parallel with said second solvent application station applying said solvent to said layers on said platen.

\* \* \* \* \*